United States Patent Office 2,710,956
Patented June 14, 1955

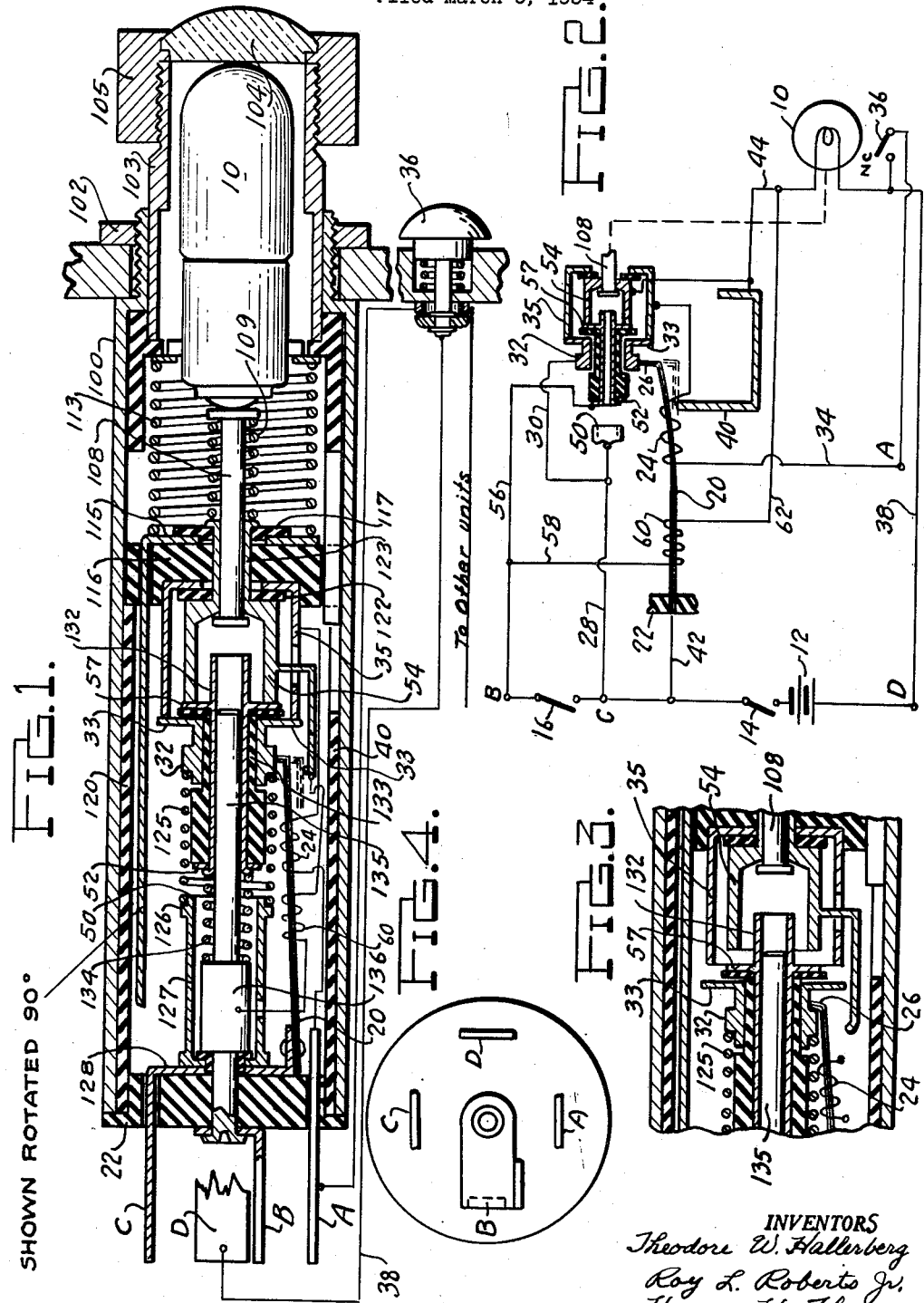

2,710,956

WARNING LIGHT WITH NORMALLY CLOSED TEST CIRCUIT

Theodore W. Hallerberg, Los Angeles, Roy L. Roberts, Jr., Fullerton, and Herman H. Flum, Southgate, Calif.; said Roberts, Jr. and said Flum assignors to said Hallerberg Application March 9, 1954, Serial No. 415,116

4 Claims. (Cl. 340—252)

This invention relates to warning lights of the type used in aircraft to indicate either a misfunction of a particular apparatus or an omission of a necessary operation. Lights of this character must be of small size and of a high degree of dependability, and preferably must be capable of separate testing apart from the circuit or apparatus being monitored. Devices incorporating the present invention meet these essential requirements and in addition have many advantages over the units known and used at the present time. The primary object of the present invention, therefore, is to improve the reliability and utility of presently known warning or monitoring lights.

Another object of the invention is to provide an improved monitoring light that will not fail to give a signal in the event of failure of any of its internal wiring apart from the lamp itself.

Another object of the invention is to provide a simple but effective and reliable testing means by which the condition of one monitoring lamp or a series of monitoring lamps can be determined by opening a normally closed switch. Opening the normally closed switch not only operates to test the lamp or lamps but also indicates to the operator that the internal mechanism of the unit is functioning properly.

Warning lights of the type with which the present invention are concerned are used in aircraft that must be flown successively on either day or night missions and perhaps by different crews. It is well known that a warning light that is of sufficient brilliance to alert an observer at night may be too dim for daytime use, and that a light of the intensity required for daytime warning may be of blinding brilliance at night. For this reason warning lights are frequently made adjustable so that the intensity thereof can be lowered by the operator should the display be of annoying brilliance. Preferably, however, the initial display of the lamp is a bright light that can be seen either at night or in the daytime, and provision is made by which the light may be instantly dimmed by the operator if desired. The light will burn at the subdued brilliance as long as the failure or monitored condition persists, but will be automatically reset to its initial condition when the power is turned off or the failure corrected.

Briefly, the present invention comprises a combination of elements including a warning lamp, a power source for the lamp, and a "function" circuit which, when closed, will cause the lamp to burn. The warning light is disposed in a casing portion of which is exposed so that the operator may move it, for example, in an inwardly axial direction, and within the casing is a latch which includes an electrically energized member that is active whenever a parallel circuit to the power source is closed, and a cooperating member moved by the movable housing part into engagement with the electrically energized latch member. Thus, when the housing part is moved by the operator the latch will be closed, and the arrangement is such that the lamp will burn at low intensity thereafter, because power to the lamp is supplied through another parallel circuit including the function switch and the resistance of the electrically energized portions of the latch. If either the function switch and the main power switch are thereafter reopened, as at the conclusion of a flight, the latch is released and the parts restored to the original position. In combination with these elements the present invention provides a separate testing means comprising a normally closed switch in series with an electrically energized portion of the latch so that opening of the circuit with which the switch is associated causes the parts to move automatically to a position to close a circuit between the power source and the lamp to be tested.

Further advantages and a disclosure of the preferred embodiment of the invention are set forth in the following specification, reference being had to the accompanying drawings in which:

Fig. 1 is a somewhat diagrammatic longitudinal sectional view of a monitor light embodying the present invention with the electrically energized latch portion being shown in dotted lines in testing position and in full lines in its "ready" position;

Fig. 2 is a circuit diagram with certain parts indicated diagrammatically;

Fig. 3 is a bottom end view; and

Fig. 4 is a fragmentary sectional view of certain of the parts standing in the position occupied during a "dim" lamp phase.

Referring first to the circuit diagram of Fig. 2, the present invention includes means for controlling the operation of a warning or monitor lamp 10, the power source for which is shown as comprising a battery 12. A main power switch 14 is in circuit with the battery, and a function switch 16 is connected to establish two parallel warning circuits as hereinafter described.

The function switch 16 is a normally open circuit controlling means that is capable of closing an electric circuit upon the occurrence of a predetermined condition. For example, the switch may be closed if engine temperature exceeds a predetermined maximum, or if a hydraulic pressure falls below a predetermined minimum. It is apparent that of the many devices and conditions required to be monitored in connection with the operation of an aircraft, nearly all of them can be arranged to close an electric circuit upon the occurrence of an abnormality or an omission.

Prior to closing of the function switch in normal operation no current flows to the lamp 10. However a testing circuit is provided by which the lamp circuit may be temporarily energized to give the operator an indication that the lamp is in operating condition and also that the mechanism within the unit is functioning properly.

A bimetallic arm 20, anchored at one end to an insulating base 22 is provided to act as an electrically (or thermally) actuated latch as hereinafter described. During normal operation when the power switch 14 is closed, the arm 20 is heated by current flowing through a "ready" winding 24 and thus is deformed to stand with a nose or hook-like end portion 26 ready to move into latching engagement with a depressible body member as hereinafter described, the ready position of the arm being shown in full lines in Fig. 2. The circuit through the ready winding 24 is as follows: from battery 12 to junction C, through lead 28, lead 30, a metallic body 32, winding 24, conductor 34 to junction A, thence through a normally closed testing switch 36 and back to the battery by conductor 38.

It will thus be seen that the circuit through the ready winding 24 is closed whenever the main power switch 14 is closed, but that the circuit may be interrupted by opening the testing switch 36. Thus the bimetallic arm 20 is normally heated by its winding 24 except when the testing switch is open. In its unheated state the bimetallic arm 20 stands in engagement with a switch point 40, and the arm itself is connected to one side of the battery by a conductor 42. The above mentioned switch point 40 is connected to the lamp 10 by a connection 44. Thus, a circuit is established to one side of the lamp 10, and the opposite side of the lamp is returned to the battery 12 by conductor 38, so that whenever the bimetallic arm 20 is unheated the lamp will burn. It is thus possible for the operator to test the lamp 10 by opening switch 36 and thus disconnecting the ready winding 24 so that it does not heat the bimetallic arm 20 and the arm will move against switch point 40 to close the lamp testing circuit. It will be apparent that the switch 36 may be constructed as a single throw, multiple contact device so that a plurality of warning lights may be tested simultaneously by the operator. In many installations warning lights are used in groups of twenty or more and the individual testing required by a "press-to-test" unit is unnecessarily time consuming so that the present invention, which permits testing a group of lights simultaneously, is advantageous.

Provision is made, however, for individual testing if the operator suspects any one of the group of warning lights. The press-to-test construction which will now be described is disclosed and claimed in our co-pending application Serial No. 412,470 and no claim is made to the elements thereof except as they enter into the new combination defined hereinafter. The individual testing circuit comprises a stationary contact 50 and a movable contact 52 that may be brought together by pressing inwardly on an exposed portion of the light assembly that extends from the instrument panel where it is readily accessible to the operator. When contacts 50 and 52 are closed the circuit to the lamp as indicated in Fig. 2 is: from battery 12, power switch 14, junction C, conductor 28, to contact 50, from contact 52 through a lamp base contacting plunger 54, conductor 44 to lamp 10 and back to the battery by conductor 38. As will be hereinafter described in connection with Fig. 1 the connections take a somewhat different physical form from that shown in Fig. 2 where they are diagrammed for clarity.

Prior to closing of the function switch no current flows to the lamp 10, during normal operation. It will be seen, however, that as soon as the power switch 14 is closed a parallel circuit around the lamp 10 is established through the ready winding. This circuit includes an internal switch which may be opened by the operator by pushing inwardly, the switch comprising a flange 33 on the metallic body 32 and a stationary tubular contact 35 cooperating therewith and connected to one side of the winding 24. As above noted the resistance of the ready winding 24 is such that the heat emanating therefrom causes the bimetallic arm 20 to assume a position such that the hook-like end 26 thereof can act as a detent in cooperation with another latch member such as the body 32 which is provided with a shoulder thereon for reception of the hook end 26. In the outer position in which switch contacts 33 and 35 are closed the end of the hook 26 stands against the metallic body 32 but does not enter over the shoulder thereof until such time as the operator pushes inwardly on the assembly as will be hereinafter described. This is done when the operator wishes to dim the display of the lamp.

The arrangement is such as to provide an initially "bright" display of the lamp 10 whenever the function switch 16 is closed. This bright circuit is as follows: from battery 12, through power switch 14, past junction C, through the function switch 16 to junction B, through a connection 56 to a movable contact 57, the lamp base contactor plunger 54 to lamp 10 and back to the battery through conductor 38. It will be noted that there are no resistive devices in this circuit so that the lamp 10 burns at full brilliance whenever the circuit is completed. The internal switch formed by contacts 57 and 54 within the housing is opened by the same movement that opens the ready switch formed by contacts 33 and 35. This second switch, as above noted, is in the bright circuit and is diagrammatically indicated in Fig. 3.

A parallel "dim" circuit to the lamp around the bright circuit above described includes a conductor 58, a second resistance winding 60 around the bimetallic arm 20 and a conductor 62 leading to the lamp from the winding 60. The resistance of the winding 60 is such that the arm 20 will be held in a latched position with its hook end 26 over the shoulder of the body 32 by the heat from this winding alone should the circuit to the ready winding 24 be opened as above described. For this reason the winding 60 is designated as a "hold" winding. The resistance of the winding being in series with the lamp 10, the lamp will glow with a subdued brilliance whenever the circuit thereto is completed only through the hold winding and by reason of the function switch 16 being closed. Prior to describing the preferred form of the various elements so far described, which form is shown in Fig. 1, the operation will be described.

In its preferred use, the present invention is incorporated in the monitoring system of airplanes. In such systems regulations require that each monitor light be tested prior to take-off. The present invention so orients the elements that this testing is done preferably by opening a single normally closed single pole switch 36 which will test all of the monitor lights simultaneously.

When the main power switch 14 is closed and the ready winding 24 immediately begins to heat-up and the bimetallic arm 20 is deformed to move away from the switch point 40. When the operator opens the normally closed switch 36 the circuit to the ready winding is interrupted and after a short interval during which the arm 20 cools, a circuit is completed through the bimetallic arm 20 and switch point 40 to the lamp. If the lamp is in operating condition it will glow at full brilliance. If desired, the operator can test each of the monitor lights individually by using the "press-to-test" technique as described in our co-pending application Serial No. 412,470. It will be seen that testing by our improved means also gives the operator an automatic indication on the operativeness of the circuit including the ready winding 24 since if this circuit is faulty the arm 20 will not be heated when the power switch 12 is closed and will not move away from the switch point 40 as it should.

It has been assumed so far that the function switch 16 is open. If during the flight a monitored function occurs the function switch 16 will close and will complete two parallel circuits. The first is through conductor 56, movable contact 57, plunger 54 to the lamp which will cause the lamp 10 to glow at full brilliance. The second circuit is through the hold winding and comprises conductor 58, winding 60 and conductor 62 to the lamp. Being of higher resistance the current flow in this circuit is very low so long as the bright circuit first above described is closed. If the operator thereafter depresses the rim of the unit to dim the display, the hook end of the bimetallic arm 20 will move in over the shoulder of the body 32 and act as a detent to retain it in its depressed position. Even though the circuit through the ready winding 24 is broken by this movement due to the separation of contacts 33 and 35 the arm 20 will remain deformed by reason of the heat supplied from the hold winding 60 alone, since the current flow therethrough becomes quite substantial as soon as its low resistance parallel circuit is opened. Movement of the sliding body member subsequently described breaks not only the contact between the ready winding switch 33, 35 but also opens the bright circuit contacts 57 and 54. Thus the only circuit through the lamp is through the hold winding and the resistance of this winding causes the lamp to glow at full brilliance. Fig. 4 shows the parts standing in the position in which the hook 26 of the bimetallic arm 20 has moved in and is in latching engagement with the shoulder of body 32 so that the internal switches above described are open.

After the function switch 16 is opened as by correction of the misfunction that has been monitored, the hold winding becomes cool by reason of the fact that no current thereafter flows through it and the arm 20 assumes its undeformed position, and the ready winding again begins to heat up as soon as the contacts 33 and 35 are again closed.

After completion of the flight the power switch 14 is opened and no current will flow either through the ready winding 24 or the hold winding 60. The device is thus positioned as is shown in Fig. 1 so that contacts 33 and 35 and 57 and 54 are again closed and any dim setting that might have been held over from the previous flight is cancelled.

Having described the schematic and diagrammatic disclosure of the invention, reference will now be made to Fig. 1 which shows a central longitudinal sectional view somewhat enlarged, of an actual embodiment. As there shown the device is housed in a casing 100 which may be conveniently threaded at its outer end for attachment to a bulkhead between a shouldered portion of the casing 100 and a gland nut 102. Within the outer portion of the casing there is disposed a cylindrical driver body 103 mounted for free reciprocating movement and having a front cylindrical extension extending from the casing to receive a lens 104 and a lens holding ring 105 which may conveniently be unscrewed in the event that a lamp is to be replaced. The lamp contacts are the usual center contact 106 and a shell contact 107 and connections to each are made by spring presssed connectors. In the case of the center lamp contact 106 the connector is in the form of a rod-like member 108 pressed outwardly by a spring 109, and in the case of the shell contact 107 the connector is in the form of a ring 111 biased upwardly by a spring 113 but limited in its outward movements by a shoulder 114 on the reciprocable portion 103 of the lamp holder. In the form shown the lamp is pressed inwardly by the engagement of its outer end with the lens 104 and the threaded ring 105 is tightened until the lamp contacts 106 and 107 are made against their respective connectors. However, a common bayonet-slot receiver may be used for the lamp 10 since the lamp mounting forms no part of the present invention.

The ring-like connector 111 is at the potential of one side of the battery 12 because spring 113 bears against a contact bar 115 which is disposed over an insulating partition 116 intermediate the ends of the housing interior, the bar being bend downwardly to extend along the side of the casing finally to emerge as a terminal D. The spring 113, and terminal D, thus correspond to conductor 38 and junction D in the diagrammatic disclosure of Fig. 2. In Fig. 1 it is necessary to show the contact bar 115 in a somewhat diagrammatic position rotated 90° from the position it would actually occupy, otherwise the entire bar would be hidden by the remaining structure within the housing. A legend to this effect has therefore been added to Fig. 1.

The inturned portion of the contact bar 115 which is disposed over the insulating partition 116 is insulated from the center rod contact 108 and its biasing spring 109 by an insulating grommet 117.

The center insulating partition 116 is carried across the interior of a housing 1 and rests over the inner end of a tubular insulating liner 120 and serves as a support for the various stationary contact members hereinafter described. At the lower, or outer side of the partition 116 there are mounted concentric cylindrical contact members 35 and 121 insulated from each other by a small insulating disk 122. The inner contact member corresponds to the contact member 54 of Fig. 2 and is provided with a hollow stem 123 that extends through an opening in disk 122, through the partition 116, through an opening in the inturned contact member 115, and through the grommet 117 where it is upset to clamp the parts in position with respect to each other and to the insulating partition 116. The stem 123 is made hollow to receive the rod-like center lamp contact member 108 and to guide it in its reciprocating movements imparted thereto when the operator presses on the lens holding ring 105 at the exposed outer end of the housing when he wishes to dim the warning light or to conduct an individual test.

The outer concentric contact 35 is also held in place by the clamping action of the inner cylindrical contactor 54 against the insulating partition 116. This contact cooperates with movable contact 33 which is formed as a flange on the body 32 and which is biased upwardly against the stationary contact 35 by a spring 125, the outer end of which bears against a shoulder 126 of a tubular metallic element 127 which in turn is clamped against a laterally extending portion 128 of terminal C. Thus the tube 127, spring 125, body 32 and the flange-like contact 33 are all at the potential of terminal C. It will be noted that the outer concentric cylindrical contact 35 is connected electrically to the ready winding 24 and that a suitable connection is made from the opposite end of the ready winding by a lead 34 to terminal A which is connected to one side of the normally closed testing switch as indicated in the circuit diagram Fig. 3.

The inner concentric contact 54 cooperates with a movable contact 57 (similarly designated in Fig. 2) which is preferably formed as a shoulder or flange extending from a tubular metallic body 132 within the body 32 and insulated therefrom by a tubular insulating member 133. The tubular body 132 carries a small plate contact at its outer end which forms the movable test contact 52, and the test contact and insulation are held in place by turning over the end of the body 132 to clamp the parts between the turned over portion and the lower face of the contact shoulder or flange. The assembly thus formed is biased inwardly toward the position in which the contacts 54 and 57 are closed by a spring 134 and the assembly is guided for reciprocation over a rod 135 which enters the tubular body 132 and which extends out of the base of the unit where it is riveted over terminal B to clamp the terminal in place with respect to the base. The rod 135 is provided with an enlargement 136 between its ends, one end of the enlargement bearing against an insulating disk to clamp the tube 127 and inturned portion 128 of terminal C against the bottom plate, and the other end of the shoulder 136 serving as a supporting shoulder for spring 134. It will thus be seen that the rod 135, the tubular body 132 and contact 57 are all at the potential of terminal B.

Individual testing of the unit may be obtained by the operator pushing inwardly on the ring 105, moving the body 103 inwardly with respect to the stationary housing. This moves the lamp 10 and its center contact 106 inwardly and the end of the contact stem 108 abuts against the upper end of the tubular body 132 so that continued inward movement of the rod-like contactor 108 is made with an electrical contact between the parts and thus to the base of the lamp 10. The tubular body 132 is thus moved by the operator until the small plate test contact 52 comes up against the stationary end of the tube 127 which thus represents the stationary test contact 50 as shown in the diagram in Fig. 2. The base of the lamp is thus brought to the potential of terminal B and connected to the battery, provided the power switch 14 is closed. If the lamp is in operating condition it will burn at full brilliance as a result of closing the test circuit between the contacts 50 and 52.

If the power switch 14 has been closed for an appreciable period of time before the above described lamp testing operation takes place, the ready winding 24 will have had current flowing therein and will have become heated sufficiently to deform the thermal arm 20 and bend it inwardly. Thus the latching hook 26 may move in over the shoulder on body 32 and keep the body from returning to its initial position after the operator releases his pressure on the ring 105 applied during the testing operation. The parts would then return only to the position shown in Fig. 4 in which contacts 54 and 57 and contacts 35 and 33 stand open. The ready winding circuit would then be broken by reason of the opening of contacts 33 and 35 so that the arm would start to cool off. As soon as the arm has cooled sufficiently, the latching hook 26 will move away from the shoulder and release body 28 and permit it to return to the position in which the switches comprising contacts 33—35 and 54—57 are closed (as shown in Fig. 1). This recloses the circuit to the ready winding and the arm 26 will again be heated, but the hook-like end 26 thereof will simply bear against the body 32, ready to move in over the shoulder upon a subsequent depressing movement as hereinafter described.

If the function switch 16 should close, the lamp 10 will burn at full brilliance, the circuit being as described above. If the operator notes the signal thus given and finds that the intensity of the lamp is disturbingly high, he can dim it by pushing in on the ring 105 to depress the parts sufficiently for the thermal arm hook 26 to move in over the shoulder of body 32. By so doing he breaks the "bright" circuit by opening switch 54—57. The hook 26 snaps in over the shoulder of body 32 and holds the switch contacts separated and in the position shown in Fig. 4. The dim circuit which includes the resistance of the hold winding 60 is thereafter effective and remains so either until function switch 16 opens due to the correction of the condition that caused it to close, or until the power switch 14 is opened at the end of the flight.

If for any reason the circuits to the ready winding 24 or to the hold winding 60 are broken, or if the thermal arm 20 should break or be rendered otherwise inoperative, the only result would be the inability of the operator to dim the signal upon closure of the function switch 16. There is no wiring within the unit that can fail in such a way that no indication will be given should the function switch close.

While the invention has been described in conjunction with a specific form and disposition of the parts it should be understood that numerous modifications and changes may be made therein without departing from the scope of the appended claims.

What we claim is:

1. In a warning light for aircraft or the like, a lamp, an electric power source, means including a function switch to establish a low resistance warning circuit from said power source through said lamp whenever a predetermined condition exists against which a warning is to be displayed, a housing for said lamp having a movable portion, a bimetallic arm anchored at one end in said housing, first and second heating coils around said bimetallic arm, means to connect said first heating coil to said power source including a normally closed testing switch, means to connect one end of said bimetallic arm to said power source, a contact associated with said bimetallic arm and connected to said lamp to complete a circuit through said power source, arm and lamp whenever said arm is unheated by said first heating coil, a parallel warning circuit including said second heating coil, and means operable by said movable housing portion to open said low resistance warning circuit and maintain said parallel warning circuit, said last means including a latch of which said bimetallic arm acts as a detent.

2. In a warning light for aircraft or the like, a lamp, an electric power source, means including a function switch to establish a warning circuit from said power source through said lamp whenever a predetermined condition exists against which a warning is to be displayed, means to establish a parallel testing circuit for said lamp comprising a bimetallic thermal arm and a contact against which said arm moves in its unheated condition, a heating coil around said arm, a normally closed circuit to connect said heating coil to said power source, and means to open said normally closed circuit whereby said thermal arm is unheated.

3. The combination of means defined in claim 2 and a second heating coil around said thermal arm in series with said function switch.

4. In a warning light for periodic use in aircraft and the like, a lamp, an electric power source, means including a function switch to establish a low resistance warning circuit from said power source through said lamp whenever a predetermined condition exists against which a warning is to be displayed, a parallel warning circuit of higher resistance, a housing for said lamp having a movable portion, means operable by said movable housing portion to open said low resistance warning circuit and simultaneously render effective said warning circuit of higher resistance, electrically energized means to maintain said higher resistance warning circuit so long as said function switch remains closed, a test circuit operable to connect said lamp and said power source, a normally closed ready circuit in parallel with said test circuit and including electrically energized means normally operative to open said test circuit, and a switch positioned for the operator to open said ready circuit whereby said test circuit is closed to indicate to the operator the condition of said lamp.

No references cited.